United States Patent [19]

Brandts Buys et al.

[11] 4,315,959

[45] Feb. 16, 1982

[54] PROCESS FOR COATING MINERAL, ORGANIC OR METALLIC MICROSCOPIC OR MACROSCOPIC SUBSTRATES

[75] Inventors: Ludwig D. G. Brandts Buys, Brussels; Pierre M. J. L. Godard, Faux-Court St. Etienne; Henri C. Goossens, Hove; Joseph J. Mignard, Sint-Joris-Weert; Jean-Luc H. M. F. G. Wertz, Céroux-Mousty; Jean-Pierre Mercier, Leuven, all of Belgium

[73] Assignees: Wyns-Bristol S.A. Peintures, Vilvoorde; N.V. Trimetal Paint Co., Machelen, both of Belgium

[21] Appl. No.: 161,176

[22] Filed: Jun. 19, 1980

[30] Foreign Application Priority Data

Jun. 25, 1979 [GB] United Kingdom ............... 22050/79

[51] Int. Cl.³ ............................................. C04B 31/02
[52] U.S. Cl. .................................. 427/214; 260/42.14; 260/42.53; 427/221; 427/407.1; 427/409; 428/500; 106/308 M; 106/300; 106/309; 106/304
[58] Field of Search .................. 106/308 M, 300, 309, 106/304; 428/500; 525/371, 326; 260/42.14, 42.53; 427/221, 214, 407.1, 407.2, 419.8, 409

[56] References Cited

U.S. PATENT DOCUMENTS 2,943,955  7/1960  Brill .................................. 427/419.8
3,560,254  2/1971  Seddon ............................... 427/221
3,878,183  4/1975  Kogg .................................. 260/42.53
3,905,936  9/1975  Hawthorne .......................... 427/221
3,993,835  11/1976 Miedaner ........................... 427/419.8
4,241,112  12/1980 Kostandi ............................ 427/214

Primary Examiner—Sam Silverberg
Attorney, Agent, or Firm—Sughrue, Mion, Zinn, Macpeak & Seas

[57] ABSTRACT

This invention relates to a process for coating mineral, organic or metallic substrates, said substrates being either microscopic, such as pigment, filler, cement or metal particles, or macroscopic, such as large sized materials.

The process according to the invention comprises a first step consisting in coating said substrate with a first layer of a composition comprising a liquid medium containing a polyhydroxylated polymer and a transition metal selected among the metals of the IB, IIB, IIIB, IVB, VB, VIB, VIIB and VIIIB groups of the periodic arrangement of the elements, capable of forming a polymer/metal complex, preferably a complex of polyvinyl alcohol and copper II, a second step consisting in applying on the first layer a polymerizable material capable of being grafted on the first layer and a third step consisting in causing said polymerizable material to become grafted to the first layer by polymerization thereon. The polymerizable material contains preferably acrylic or methacrylic unsaturations.

24 Claims, No Drawings

PROCESS FOR COATING MINERAL, ORGANIC OR METALLIC MICROSCOPIC OR MACROSCOPIC SUBSTRATES

DEFINITIONS

The terms "microscopic substrate", as used in this specification and in the claims, mean small sized mineral or organic particles, such as pigment particles, for instance titanium oxide, red iron oxide, kaolinite, barytus, zinc oxide, calcium carbonate and similar pigments, or particles of other mineral materials, such as cement or metal particles, which may be used in the paint, rubber, plastic, paper, building industries and the like.

The terms "macroscopic substrate", as used in this specification and in the claims, mean large sized materials, such as shaped mineral articles, such as stones, blocks, bricks, concrete surfaces, panels, plates, walls made of mineral materials, such as baked clays, cement, fibrous materials containing glass or asbestos fibers, such as for example of asbestos and cement, glass made articles, as well as metallic shaped elements made of iron, copper zinc, aluminium and the alloys thereof, cellulosic shaped elements made of wood, agglomerated cellulosic fibers, plastic shaped articles made of polyesters, polyvinyl chloride, polyvinyl acetate, polyolefins, acrylic and methacrylic polymers, polycarbonates and the copolymers and derivatives thereof. Such macroscopic substrates may be used in the building industry, namely in buildings, bridges, viaducts, tunnels and the like.

PRIOR ART

It is known to apply on microscopic or macroscopic substrates, for instance on individual pigment or filler particles, a layer of a polymer by a process involving the addition to an aqueous dispersion of said particles of an anchoring agent capable of reacting, for example by copolymerization, with other monomers or prepolymers, under the influence of a polymerization initiator with or without an accelerator, such a reaction taking place in situ.

These known processes have generally several drawbacks, such as agglomeration of particles, poor anchoring of the protecting layers to the microscopic or macroscopic substrates and undue increase of the thickness of the coatings.

This invention relates to a coating process which avoids said drawbacks in a surprisingly simple manner.

BRIEF DESCRIPTION OF THE INVENTION

The process according to the invention for coating microscopic or macroscopic mineral, organic or metallic substrates is essentially characterized by a first step consisting in coating said substrate with a first layer of a composition comprising a liquid medium containing a polyhydroxylated polymer and a transition metal selected among the metals of the IB, IIB, IIIB, IVB, VB, VIB, VIIB and VIIIB groups of the periodic arrangement of the elements capable of forming a polymer/-metal chelate of complex, hereafter called "complex", a second step consisting in applying on the first layer a polymerizable material capable of being grafted on the first layer, and a third step consisting in causing said polymerizable material to become grafted to the first layer by polymerization thereon.

The most preferred polymer contained in the first layer applied on a substrate in the process according to this invention is polyvinyl alcohol (PVA) having a molecular weight of about 13,000 to 132,000 and a hydrolysis rate of about 78% to 99.5%. The terms "polyvinyl alcohol" and "PVA" as used herein, mean the polymers of the structure

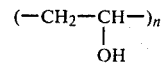

as well as the random copolymers obtained by incomplete hydrolysis of polyvinyl acetate.

The metal contained in the first layer applied on a substrate in the process according to this invention is preferably selected among the following transition metals: copper, nickel, cobalt, iron, manganese, aluminium, chromium, vanadium, titanium and cerium. The most preferred metal is copper, in the form of the cation copper II.

The first layer containing the polymer and the metal salt preferably as a polymer/metal complex is adsorbed, in an irreversible manner, on the microscopic or macroscopic mineral or organic substrates. This irreversible bond is apparently due to OH groups of the polymer which are fixed in a non removable manner on the mineral or organic substrates by means of hydrogen bondings or esterification with elimination of the surface water layer from these substrates.

It has been found that the first layer made of a liquid medium containing a complex of a polyhydroxylated polymer and of a metal, particularly of the PVA/Cu-II acts, when it is applied on microscopic or macroscopic substrates, as a supported catalyst which is capable of initiating the polymerization of the polymerizable material preferably containing acrylic or methacrylic unsaturations, when an aqueous medium of said polymerizable material is applied on said layer. The activity of the complex increases in the presence of alkyl halides selected for example among the carbon tetrahalides such as carbon tetrachloride or carbon tetrabromide.

Thus, the substrate treated by the process according to this invention carries two layers, i.e. a first layer of complex, preferably a PVA/Cu-II complex, and a second layer of a grafted polymerized material obtained from a polymerizable material containing acrylic or methacrylic unsaturations selected among the (1) monomers consisting of acrylic and methacrylic acid salts or alkyl esters, particularly the $C_1$ to $C_{20}$ alkyl esters such as methyl, ethyl, butyl, hexyl, octyl, decyl, dodecyl, octadecyl or stearyl acrylates and methacrylates, in which the alkyl groups may be substituted, (2) monomers consisting of acrylamide, methacrylamide and their derivatives, (3) U.V. prepolymers and (4) mixtures of said (1), (2) and (3) with vinylic monomers, such as vinyl acetate, styrene, polymerizable esters, urethanes and the like.

The second protecting layer of polymerized material is irreversibly attached to the first layer of complex so that the treated substrate becomes water repellant and has an organophyllic character.

The present invention relates particularly to a process for coating microscopic substrates, such as pigment particles, in which the microscopic substrates are dispersed in an aqueous medium, an aqueous composition containing a complex of a polyhydroxylated polymer and of a transition metal such as copper, nickel, cobalt or zinc is added to said dispersion by stirring, whereby the amount of polyhydroxylated polymer added to the pigment dispersion is such that the individual microscopic substrates are coated with an at least monomolecular first layer of said polymer, complexed with the metal, a polymerizable material containing acrylic or methacrylic unsaturations being applied as a second layer onto the first layer, the polymerizable material being finally treated at a suitable temperature until the acrylic or methacrylic unsaturations have substantially disappeared.

EXAMPLES OF PREPARATION OF POLYVINYL ALCOHOL-METAL COMPLEXES

The complex compositions used as a first anchoring layer on a microscopic or macroscopic substrate in the first step of the process according to this invention may be prepared by known methods, such as those exemplified hereafter:

I. Preparation of a PVA/Cu-II complex aqueous solution 8.33 g of PVA (polymeric ligand) having a degree of hydrolysis of about 86% or 100% have been dissolved in 500 ml of water, the solution being stirred and heated to a temperature of about 95° C. during about 30 minutes.

3.17 g of copper nitrate [$Cu(NO_3)_2$], (i.e. an amount corresponding to 0.83 g of metallic copper) have been added to the PVA aqueous solution.

While stirring the solution, the latter was cooled to the room temperature.

In a reactor equipped with a stirrer and a pH-meter, 300 ml of water have first been introduced, whereafter 500 ml of the solution of PVA and $Cu(NO_3)_2$ and $10^{-1}$ molar solution of NaOH have been added drop by drop, the mixture being still stirred and the pH being adjusted so as to be kept at a value of about 6 to 7. The adjustment of the pH was effected by regulating the flow rate of the solutions introduced drop by drop in the reactor. The reaction took place under continuous agitation and at room temperature.

II. Preparation of a PVA/Ni-II complex aqueous solution

Said solution has been prepared in the manner described in example I, except that nickel nitrate was used instead of copper nitrate and that the pH was maintained at 9.90.

III. Preparation of a PVA/Co-II complex aqueous solution

Said solution was prepared as described in example II, except that cobalt nitrate was used instead of nickel nitrate and that the pH was maintained at 9.95.

IV. Preparation of a PVA/Zn-II complex aqueous solution

Said solution was prepared as described in example II, except that zinc nitrate was used instead of nickel nitrate and that the pH was maintained at 9.4

EXAMPLES ILLUSTRATING THE PROCESS ACCORDING TO THE INVENTION

The following examples illustrate the process according to the invention.

EXAMPLE 1

(a) $TiO_2$ particles coated with a PVA/Cu-II complex layer

In a ball mill of a capacity of 1 liter containing 780 g of steatite balls having a diameter of 5 mm and equipped with stirring arms turning at a speed of 150 revolutions per minute, 44.8 g of an aqueous solution containing 2% of Orotan 731 also called Tamol (sodium salt of polycarboxylic acid sold by Rohm and Haas Cy) and 8.9 g of pure water have been added.

140 g of titanium oxide particles have been introduced into the mill and the mixture was agitated during 10 minutes at room temperature, the stirring arms rotating at a speed of 150 revolutions/minute. 51.125 ml of an aqueous solution of the PVA/Cu-II complex have been added in one step to the content of the mill, the pH of the solution being of 7 and the solution containing 1.33 g/dl of PVA and 0.0667 g/dl of Cu-II.

The mixture containing the complex solution was stirred during 15 minutes at room temperature so as to obtain the adsorption equilibrium of the complex on the $TiO_2$ particles.

Treated pigment particles separated from the medium showed that each pigment particle was coated with a layer which was at least monomolecular of complex, which was irreversibly fixed to said particle.

(b) $TiO_2$ particles coated with polymethylmethacrylate (PMMA) formed on a first layer of PVA/Cu-II complex In the dispersion of particles of titanium oxide coated with a thin layer of a PVA/Cu-II complex obtained as described hereabove, nitrogen was bubbled, whereas the dispersion was still stirred at a speed of stirrer arms of 150 revolutions/minute. Another about 30 minutes, the dispersion was heated at about 85° C., the mill being equipped with a condenser for condensing the vapours.

14 g of methyl methacrylate and 1.4 g of carbon tetrabromide dissolved in the monomer have then progressively been introduced into the mill at a rate of 2 ml after each 15 minute period. Said addition was made under a nitrogen atmosphere, so as to avoid a brutal evaporation of the monomer. At a temperature of 85° C., under such a nitrogen atmosphere, the polymerization occured. The polymerization with grafting on the pigment has been allowed to proceed during 3 hours, to be sure that the polymerization yield be of 100%.

Tests such as transmission electron microscopy and Hegman fineness have shown that the size of the treated pigment particles was nearly identical to the size of the untreated particles.

EXAMPLE 2

Other pigments than $TiO_2$ coated with polymethylmethacrylate formed on a first layer of PVA/Cu-II complex Using the operating conditions described in example 1, kaolinite, red iron oxide and barytus particles coated with a first layer of a PVA/Cu-II complex as described in example 1a except that, in the case of barytus, the pH of the complex solution was of 12 instead of 7, have respectively been treated with methyl methacrylate, in the presence of carbon tetrabromide, in the manner described in example 1b.

EXAMPLE 3

Portland cement particles coated with polymethylmethacrylate on a first layer of PVA/Cu-II complex Portland cement particles have been primed with a PVA/Cu-II complex layer in the manner described in example 1a.

It was also possible to proceed with a non complexed solution of PVA and Cu-II; due to the alkalinity of the cement, the complex was formed on the particle surfaces.

140 g of the primed cement particles have been dispersed in water in manner similar to that described in example 1a. 18.7 ml of a $10^{-1}$ M aqueous solution of hydrazine were then mixed with the dispersion of cement particles. 14 ml of methyl methacrylate and 1.4 ml of carbon tetrachloride dissolved in the monomer have then been added progressively, so as to polymerize the monomer on the primed cement particles.

Using hydrazine hydroxide ($NH_2$—$NH_2$—OH), hydrazine sulfate ($NH_2$—$NH_2$—$SO_4$) benzhydrazide ($C_7H_7N_2O$), carbonylhydrazide ($CH_6N_4O$) or acetohydrazide ($C_2H_6N_2O$), it was found that the methyl methacrylate was also completely polymerized and irreversibly grafted, under the form of a very thin layer on cement particles.

EXAMPLES 4 TO 6

Portland cement particles coated with polymethylmethacrylate on a first layer of PVA/Cu-II complex Using the method described in example 3, except that the solution of hydrazine has been replaced by a $10^{-1}$ M aqueous solution of triethanolamine, methyldiethanolamine or dimethylethanolamine, a layer of polymethylmethacrylate (yield of polymerization: 100%) has been obtained at 60° C. on the primed cement particles with grafting of the polymer to the cement.

EXAMPLES 7 TO 10

Pigment particles coated with polymethylmethacrylate formed on a first layer of PVA/Cu-II complex Particles of titanium oxide, iron (III) oxide, zinc oxide and kaolinite have been primed with a PVA/Cu-II complex layer as described in example 1a.

14 g of a $10^{-1}$ m triethanolamine solution in methyl methacrylate and 1.4 ml of carbon tetrachloride was progessively added and mixed to the aqueous dispersion of the primed pigment particles (140 g).

After 3 hours, it was found that the yield of polymerization of the acrylic monomer was of 100% with a grafting of more than 30%.

EXAMPLES 11 TO 13

Pigment particles coated with acrylic polymers formed on a first layer of PVA/Cu-II complex The same result as the one disclosed in examples 7 to 10 has been obtained when hydroxyethylmethacrylate, dimethylaminoethylmethacrylate and glycidylacrylate have been used with or instead of methyl methacrylate.

EXAMPLE 14

Comparative tests with coated pigments

For these tests the following pigments have been used:
  untreated talc and kaolinite particles;
  talc and kaolinite particles primed with a known anchoring agent and then coated with methyl methacrylate polymerized by a classical redox system;
  talc and kaolinite particles primed with a PVA/Cu-II complex and then coated with methyl methacrylate polymerized by the complex.

Particles of talc and kaolinite were primed with a PVA/Cu-II complex layer and coated with PMMA ans described in example 1 except that 67.2 g of the solution of Orotan and 13.5 g of water were used for the dispersion step.

Particles of talc and kaolinite were primed with a known anchoring agent and coated with PMMA by the following method.

(a) Dispersion

In a ball mill of a capacity of 1 liter containing 780 g of steatite balls of a diameter of 5 mm and equipped with stirring arms, 67.2 g of an aqueous solution containing 2% of Orotan 731 and 13.5 g of water have been added.

After the addition of 140 g of talc or kaolinite particles, these particles have been dispersed by agitating during 10 minutes at room temperature, the stirring arms rotating at a speed of 150 revolutions/minute.

(b) Adsorption

The dispersion particles of talc and kaolinite have been coated respectively with a known anchoring agent, namely 54 g of an aqueous solution containing 5.7% of of methacrylic acid while stirring the mixtures during 15 minutes.

(c) Polymerization

The obtained dispersions have then been bubbled with nitrogen and heated at 85° C. To the stirred and heated dispersions 10 g of methyl methacrylate have been gradually added. Then, 1.18% by weight of $K_2S_2O_8$ and 5.94% by weight of $Na_2S_2O_5$ (with regard to the monomer) dissolved in a small amount of water were added as polymerization initiators. The polymerization of the methyl methacrylate on the treated particles was allowed to proceed during 3 hours.

Composite materials have been prepared by mixing polymethylmethacrylate (PMMA) of a mean molecular weight of 180,000 in a roller-mill at 220° C. during 3 minutes, the rotation speed being of 30 revolutions per minute and the friction coefficient of 1.1.

The obtained mixtures have than been moulded at 250° C. in a Fonteyne moulding apparatus, under a pressure of 70 kg/cm².

The elasticity modulus has been determined at a fixed loading time interval of 10 seconds with a Gehmann torsion tester (ASTM D-1053). The results have been computed in the form of 3G(10), G being the shear modulus and 3G being practically equivalent to the Young's modulus.

The following table shows the variation of the elasticity modulus [3G(10)] as a function of the temperature.

TABLE I

| Mixtures | | Modulus of elasticity (3G) in kg-cm$^2$ Temperature C. | | | | | |
|---|---|---|---|---|---|---|---|
| | | 20 | 60 | 100 | 140 | 180 | 220 |
| PMMA + | 38% untreated talc | $7 . 10^4$ | $4.5 . 10^4$ | $0.58 . 10^4$ | $0.75 . 10^2$ | 8 | <0.1 |
| PMMA + | 38% talc coated with known anchoring agent and PMMA | $8.8 . 10^4$ | $5.8 . 10^4$ | $1.5 . 10^4$ | $1.7 . 10^2$ | 80 | 2.5 |
| PMMA + | 38% talc coated with PVA/Cu-II complex and PMMA | $9.4 . 10^4$ | $6.4 . 10^4$ | $2 . 10^4$ | $2.1 . 10^4$ | 120 | 50 |
| PMMA + | 50% untreated kaolinite | $6.3 . 10^4$ | $5 . 10^4$ | $1 . 10^4$ | $1.4 . 10^2$ | 11 | 0.2 |
| PMMA + | 50% kaolinite coated with known anchoring agent and PMMA | $9 . 10^4$ | $6 . 10^4$ | $2.1 . 10^4$ | $3.5 . 10^2$ | 150 | 70 |
| PMMA + | 50% kaolinite coated with PVA/Cu-II complex and PMMA | $10.5 . 10^4$ | $8 . 10^4$ | $3.4 . 10^4$ | $5 . 10^2$ | 300 | 140 |

This table shows clearly that talc as well as kaolinite when used as reinforcing fillers for polymethylmethacrylate (PMMA) give surprisingly better results, when the fillers have been coated with a PVA/Cu-II layer on which a PMMA is grafted than when untreated fillers or fillers coated with a known anchoring agent (methacrylic acid) on which a PMMA is less good grafted were used.

EXAMPLE 15

Asbestos-cement plates coated with an acrylic polyester formed on a first layer of PVA/Cu-II complex (a) Asbestos-cement plates (10 cm×30 cm×0.3 cm) have been dipped into an aqueous solution of a polyvinyl alcohol having a hydrolysis rate of 99.5% with a concentration of 0.667 g/dl abd of copper nitrate, the ratio Cu/PVA being of 0.1.

The plates have been maintained in said bath during 1 hour at room temperature.

Due to the alkalinity of the plates, a PVA/Cu-II complex has been formed on the surface of the plates and was irreversibly fixed on said surface.

(b) These asbestos-cement plates have then been treated by means of an aqueous emulsion of the oil-in-water type prepared as follows:

An emulsion having a dry extract of 55% of a polymer with acrylic unsaturations, such as SYNOCURE 3130 (an urethane acrylate prepolymer sold by CRAY VALLEY PRODUCTS LIMITED, Orpington, U.K.) containing 5% by weight of dissolved carbon tetrabromide was prepared. A small amount of an emulsifying agent, such as Triton X 301 sold by ROHM and HAAS CY., as well as a small amount of a colloidal protector such as Natrosol 250 HR sold by HERCULUS Cy, were added to said emulsion. The obtained mixture was stirred in a Cowles dissolver at 2000 revolutions/minute during 10 minutes while water was progressively added, the agitation speed being finally increased to 5900 revolutions/minute.

Primed asbestos-cement plates have been coated with the aqueous emulsion by means of a K-bar Hand Coater (sold by R K Print Coat Instruments Ltd, U.K.) the film thickness being of 75 microns. The coated plates were then placed in a drying oven at 120° C. under a nitrogen atmosphere during 3 hours, so as to enable the complete polymerization of the polyester. The obtained plates were coated with a uniform dry and transparent film.

The analysis of the coating by multiple reflection infrared spectroscopy showed that the acrylic unsaturations have completely disappeared.

EXAMPLE 16

Asbestos-cement plates previously primed with a complex, coated with an acrylic polyester containing pigments coated with PVA/Cu-II complex Asbestos-cement plates have been primed with a PVA/Cu-II complex as described in example 15a.

On the other hand, an emulsion of the oil-in-water type of the acrylic polymer and carbon tatrabromide containing dispersed particles of titanium oxide coated with a PVA/Cu-II complex was prepared as follows:

(a) The emulsion of the oil-in-water type of the unsaturated acrylic polymer was prepared in a Cowles stirrer, using as emulsifying agents MB I and D 40 both sold by ABM Chemicals Limited. Water was progressively added to the organic phase which was stirred at a speed of 5900 revolutions/minute. When a phase inversion took place the speed was decreased to 1000 revolutions/minute. An additional amount of water was then added while the stirring speed was again increased to 5900 revolutions/minute.

(b) A water dispersion of a titanium oxide coated with a layer of the PVA/Cu-II complex was prepared.

(c) The pigment dispersion was added to the aqueous emulsion of the resin under a slight agitation.

The pigmented emulsion was then applied on the primed asbestos-cement plates by means of a K-Hand Coater, the plates being then placed in a drier at a temperature of 80° C. under nitrogen during 3 hours for a complete cross-linking.

The obtained plates carried a dry, opaque and flat film having a Tg close to 20° C. Tg is the glass temperature.

EXAMPLE 17

Asbestos-cement plates coated with an acrylic resin containing a complexed pigment, formed on a first layer of PVA/Cu-II complex The adsorption of PVA/Cu-II complex on asbestos-cement plates was made as described in example 15a and the synthesis of the pigmented emulsion was effected in the manner described in example 16, except that 40% by weight of hexanedioldiacrylate in respect of the total weight of the reactive material were added.

The primed plates were coated with the emulsion as described in example 16 and the coated plates have been placed in a drier at 120° C. during 3 hours, under a nitrogen atmosphere.

The films applied on the primed plates had a Tg of about 60° C. and did no more contain acrylic unsaturations.

EXAMPLE 18

Primed asbestos-cement plates coated with acrylic resins (a) The adsorption of PVA/Cu-II complex on asbestos-cement plates and the synthesis of the pigmented emulsion have been effected in the manner described in example 16, except that instead of an acrylic polyester, a mixture of 60% by weight of acrylic polyurethane, 30% by weight of neopentylglycoldiacrylate, 5% by weight of copper acrylate and 5% by weight of glycidylmethacrylate was used. The pigmented emulsion was applied on the plates as described in example 16. The coated plates have then been placed in a drier at a temperature of 60° C., under nitrogen, during 3 hours. The obtained films were dry, flat and free from acrylic unsaturations.

(b) The method disclosed in part a of this example was used, except that the reaction mixture consisted of 60% by weight of acrylic polyurethane, 30% by weight of trimethylolpropanetriacrylate, 5% by weight of acrylamide and 5% by weight of trimethylolpropanediallylether.

(c) A coated opaque and flat film was applied on primed asbestos-cement plates in the manner described in part a of the present example, except that the reaction mixture of the emulsion consisted of 60% by weight of an acrylic polyurethane, 30% by weight of hexanedioldiacrylate, 5% by weight of sodium acrylate and 5% by weight of cyanoethylacrylate.

EXAMPLE 19

Asbestos-cement plates coated with varnish applied either on a plate primed with a complex or on an unprimed plate Samples of varnishes were prepared as follows:

5 parts by weight of a montmorillonite (TIXOGEL WM) have been mixed with 45 parts by weight of a PVA/Cu-II complex solution containing 2% of PVA and 0.2% of Cu and having a pH of 6.5 and with 50 parts of demineralized water.

The mixture was stirred during 10 minutes in a COWLES mixer at a speed of 2500 revolutions per minute.

To an aqueous emulsion of 50% by weight of an urethane acrylate prepolymer, particularly SYNO-CURE 3130 (sold by Cray Valley Products Limited, Orpington, U.K.), containing 5% of carbon tetrabromide, 3 to 10% by weight of primed or unprimed Tixogel have been added and the mixture was stirred during 2 minutes in the stirrer at 250 revolutions/minute.

The obtained varnish was applied on asbestos-cement plates and the prepolymer was allowed to polymerize at 120° C. during 2 hours.

The same varnish was also applied on asbestos-cement plates carrying a layer of PVA/Cu-II complex obtained in the manner described in example 15a. When PVA/Cu-II complex was not present (varnish samples 1 and 2), a mixture of 2% of cumene hydroperoxide (Trigonox K-70, AKZO) and 2% of cobalt octoate (NL46P, AKZO) was added as polymerization catalyst (redox catalysts).

The adherence of the obtained coatings have been measured by the method using a Twist-o-meter (Epprecht Instruments+Controls, Bassersdorf, Switserland).

The following table II shows the obtained results.

TABLE II

| Varnish samples | Asbestos-cement plates | Tixogel present | Catalysts present | Adherence torsion* (N/mm$^2$) |
|---|---|---|---|---|
| 1 | without complex priming | no | yes | 12 |
| 2 | without complex priming | yes, without complex | yes | 14 |
| 3 | without complex priming | yes, without complex | no | 15 |
| 4 | with complex priming | no | no | 30 |
| 5 | with complex priming | yes, with complex | no | 20 |

*average on six results

This table shows clearly that the adhesion of the varnish layer is far better when the asbestos-cement plates have been previously primed with a PVA/Cu-II complex.

EXAMPLE 20

Asbestos-cement plates coated with a paint applied either on a primed or unprimed plate 44.8 g of a 2% aqueous solution of OROTAN 731 and 9.0 g of water per 140 g of pigment have been introduced in a ball mill of a capacity of 1 liter. After the addition of 780 g of steatite balls of a diameter of 5 mm, the mixture has been stirred during 60 minutes. Pigment 1 was TiO$_2$ and pigment 2 a mixture of Fe$_3$O$_4$, baryta, titanium oxide and talc.

51.1 g of water or of an aqueous solution of PVA/Cu-II complex containing 1.33% of PVA and 0.067% of copper have then been added to the mill content and the stirring was continued during 1 hour. So a dispersion of pigment which was unprimed or primed was obtained.

50 g of the obtained dispersion have been mixed with 50 parts of an aqueous emulsion of 50% by weight of an urethane acrylate prepolymer, particularly SYNO-CURE 3130 containing 5% of carbon tetrabromide. The obtained mixture has been homogenized during 2 minutes in a mixer at a speed of 200 revolutions/minute, so as to obtain a paint. When PVA/Cu-II complex was not present (a mixture of 2% of cumene hydroperoxide (Trigonox K-70, AKZO) and 2% of cobalt octoate (NO46P, AKZO) was added as polymerization catalyst (redox catalysts for paint samples 1 and 3) or then the polymerization was effected by known electron beam curing (EBC for paint samples 2 and 4).

The obtained paint was applied by means of a filmograph equipped with a spiral of a thickness of 75 microns on asbestos-cement plates and the prepolymer was allowed to polymerize at 120° C. during two hours.

The same paint was also applied on asbestos-cement plates carrying a layer of PVA/CU-II complex, obtained as described in example 15a.

The various painted plates have been submitted to a known test for determining the quality of the paint. This test consists in rubbing the painted surfaces by means of a cotton-wool pad impregnated with methylethylketone. The time in seconds needed for attacking the paint layer is measured.

The following table III gives the results obtained by this test:

TABLE III

| Paint samples | Pigments | Asbestos-cement plates | Polymerization | Methylethylketone rubbing test |
|---|---|---|---|---|
| 1 | unprimed pigm. 1 | without priming | Redox | 2 |
| 2 | unprimed pigm. 1 | " | EBC | 2 |
| 3 | unprimed pigm. 2 | " | Redox | 3 |
| 4 | unprimed pigm. 2 | " | EBC | 2 |
| 5 | primed pigm. 2 | " | — | >60 |
| 6 | primed pigm. 1 | with priming | — | >60 |
| 7 | primed pigm. 2 | with priming | — | >60 |
| 8 | primed pigm. 1 | " | — | >60 |

This table shows that the presence of a complex as a primer and/or in the paint layer improves drastically the quality of the paint, due to a polymerization with grafting of the polymer to the complex.

EXAMPLE 21

Metal plates coated with a complex layer on which an acrylic polymer is grafted

Phosphated steel plates have been dipped into an aqueous solution of PVA/Cu-II complex having a concentration of 1% of PVA and 0.1% of Cu-II.

The metallic plates have been maintained during 1 hour in said bath at room temperature.

The treated metal plates carried a strongly adherent layer of complex, said layer acting as a primer.

The treated phosphated steel plates have been coated with pigmented emulsion as described in example 15b.

EXAMPLE 22

Plastic plates coated with a complex layer on which an acrylic polymer is grafted Plates of polyvinyl chloride have been dipped into a bath of an aqueous solution of a PVA/Cu-II complex containing 2% of PVA and 0.2% of Cu-II.

For a good adsorption on the plastic plates, the latter have been maintained during 1 hour in said bath.

The treated plastic plates have been coated with a pigmented emulsion as described in example 15b.

The obtained coatings adhered firmly to the plastic plates and were free from acrylic unsaturations.

EXAMPLE 23

Primed asbestos-cement plates coated with an acrylic prepolymer in aqueous emulsion under atmospheric oxygen (a) The adsorption of the PVA/Cu-II complex on asbestos-cement sheets has been realized in the manner described in example 15a.

(b) The emulsion was prepared in the manner described in example 15b. To the obtained emulsion, 5% by weight of a parafin wax, such as MB 25B (manufactured by Tootal France) with a melting point of 66° C., was added. The obtained mixture was stirred in a dissolver with a helicoidal stirring element turning at 2000 revolutions/minute during 10 minutes. Then, 1.5% by weight of triethanolamine was mixed with the emulsion.

(c) Primed asbestos-cement sheets have been coated with the aqueous emulsion and set in a drying oven at 120° under atmospheric oxygen during 3 hours, so as to enable the complete polymerization of the acrylic prepolymer. The obtained sheets were coated with an uniform, dry and transparent film.

The methylethylketone rubbing test (see example 21) was of more than 60 seconds.

What we claim is:

1. A process for coating microscopic or macroscopic mineral, organic or metallic substrates, comprising a first step consisting in coating said substrate with a first layer of a composition comprising a liquid medium containing a polyhydroxylated polymer and a transition metal selected among the metals of the IB, IIB, IIIB, IVB, VB, VIB, VIIB and VIIIB groups of the periodic arrangement of the elements capable of forming a polymer/metal complex, a second step consisting in applying on the first layer a polymerizable material capable of being grafted on the first layer and a third step consisting in causing said polymerizable material to become grafted to the first layer by polymerization thereon.

2. A process according to claim 1, in which, in the composition used for coating the substrate with the first layer, the polymer and the metal are in complexed form.

3. A process according to claim 2, in which, in the composition used for coating the substrate with the first layer, the complex is a complex of a metal and of a polyhydroxylated polymer selected from the group consisting of hydrosoluble polyvinyl alcohol and the copolymers thereof, starch and dextranes.

4. A process according to claim 2, in which, in the composition used for coating the substrate with the first layer, the complex is a complex of polyvinyl alcohol or a copolymer of vinyl alcohol and at least one other monomer and of a metal selected from the group consisting of copper, nickel, cobalt, iron, manganese, aluminium, chromium, vanadium, titanium and cerium.

5. A process according to claim 2, in which, in the composition used for coating the substrate with the first layer, the complex is a complex of polyvinyl alcohol and of copper II.

6. A process according to claim 1, in which the second layer is obtained by polymerizing on the first layer a polymerizable material containing acrylic or methacrylic unsaturations.

7. A process according to claim 6, in which the polymerizable material containing acrylic or methacrylic unsaturations is selected from the group consisting of (1) monomers consisting of acrylic and methacrylic acid salts or alkyl esters, (2) monomers consisting of acrylamide, methacrylamide and their derivatives, (3) U.V. prepolymers and (4) mixtures of said (1), (2), (3) with vinyl monomers.

8. A process according to claim 6, in which the polymerizable material containing acrylic or methacrylic unsaturations is selected from the group consisting of the (1) monomers consisting of acrylic or methacrylic acid salts or alkyl esters, (2) monomers consisting of acrylamide, methacrylamide and their derivatives, (3) U.V. prepolymers and (4) mixtures of said (1), (2), (3) with vinyl monomers selected from the group consisting of styrene, acrylonitrile, vinyl acetate and vinyl chloride.

9. A process according to claim 6, in which the polymerizable material is an acrylic ester or polyester.

10. A process according to claim 6, in which the polymerizable material consists of methyl-acrylate or methacrylate.

11. A process according to claim 6, in which the polymerizable material is an urethane acrylic prepolymer.

12. A process according to claim 6, in which an aqueous medium containing at least one polymerizable material containing acrylic or methacrylic unsaturations is applied on the complex layer and the coated substrate is then treated at a suitable temperature until the acrylic or methacrylic unsaturations have substantially disappeared.

13. A process according to claim 6, in which an aqueous medium containing at least one polymerizable material containing acrylic or methacrylic unsaturations is applied on the complex layer and the coated substrate is then treated at a suitable temperature, in the presence of carbon tetrabromide or carbon tetrachloride until the acrylic or methacrylic unsaturations have disappeared.

14. A process according to claim 1, in which the substrate consists of particles of cement, of a pigment or of a filler.

15. A process according to claim 1, in which the substrate is a metal.

16. A process according to claim 1, in which the substrate is selected from the group consisting of glass, building materials, plastic materials and cellulosic materials.

17. A process according to claim 1 in which the substrate consists of an element made of asbestos and cement.

18. A process according to claim 16, in which the plastic material is selected from the group consisting of the polyesters, polyvinyl chlorides, polyolefins, polystyrenes, acrylic and methacrylic polymers, polycarbonates and the copolymers and derivatives thereof.

19. A process according to claim 7 wherein the alkyl esters are $C_1$ to $C_{20}$ alkyl esters, in which the alkyl groups are substituted or unsubstituted.

20. A process according to claim 8 wherein the alkyl esters are $C_1$ to $C_{20}$ alkyl esters, in which the alkyl groups are substituted or unsubstituted.

21. The process according to claim 14 wherein the substrate is a pigment metal selected from the group consisting of titanium oxide, iron oxide, kaolinite, barytus and calcium carbonate.

22. The process according to claim 15 in which the metal is selected from the group consisting of iron, zinc, copper, aluminum and the alloys thereof.

23. A process according to claim 1, in which an aqueous medium which contains a polymerizable material containing acrylic or methacrylic unsaturations is pigmented by at least one microscopic substrate, the obtained pigmented medium is applied on a macroscopic substrate previously coated with a complex of polyvinyl alcohol and copper II and the so-coated macroscopic substrate is treated at a suitable temperature until the acrylic or methacrylic unsaturations have disappeared.

24. A process according to claim 1, in which an aqueous medium which contains a polymerizable material containing acrylic or methacrylic unsaturations is pigmented by at least one microscopic substrate, which has been previously coated with a complex or polyvinyl alcohol and copper II, the obtained pigmented medium is applied on a macroscopic substrate possibly previously coated with a complex of polyvinyl alcohol and copper II and the so-coated macroscopic substrate is treated at a suitable temperature until the acrylic or methacrylic unsaturations have disappeared.

* * * * *